(12) United States Patent
Van Der Voort

(10) Patent No.: US 6,685,526 B2
(45) Date of Patent: Feb. 3, 2004

(54) METHOD OF PROVIDING A FILM ON A SURFACE, DEVICE FOR PROVIDING SAID FILM, AND DISPLAY SCREEN PROVIDED WITH SAID FILM

(75) Inventor: André Van Der Voort, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 475 days.

(21) Appl. No.: 09/738,918

(22) Filed: Dec. 14, 2000

(65) Prior Publication Data

US 2001/0006732 A1 Jul. 5, 2001

(30) Foreign Application Priority Data

Dec. 24, 1999 (EP) .............................................. 99204530

(51) Int. Cl.$^7$ .................................................. H01J 9/24
(52) U.S. Cl. ........................................... 445/58; 445/8
(58) Field of Search .................... 445/8, 58; 156/285, 156/542, 552, 571, 582

(56) References Cited

U.S. PATENT DOCUMENTS 4,838,982 A * 6/1989 Klaeser et al. .............. 156/552
5,061,334 A * 10/1991 Paules ......................... 156/542
6,276,421 B1 * 8/2001 Valenti et al. ............... 156/285
6,524,423 B1 * 2/2003 Hilt et al. .................... 156/552

FOREIGN PATENT DOCUMENTS

| DE | 2853033 A1 | 6/1980 | ........... B29C/27/30 |
| DE | 3319612 A1 | 12/1983 | ........... B29C/27/14 |
| FR | 2693149 | 1/1994 | ........... B32B/35/00 |
| FR | 2693149 A1 | 1/1994 | ........... B32B/35/00 |
| GB | 2298816 | 9/1996 | ............. B32B/1/10 |
| NL | 2853033 | 6/1980 | ........... B29C/27/30 |
| NL | 3319612 A1 | 12/1983 | ........... B29C/27/14 |

* cited by examiner

Primary Examiner—Kenneth J. Ramsey
(74) Attorney, Agent, or Firm—Aaron Waxler

(57) ABSTRACT

A method and a device for affixing a film (7) of a predetermined length to a surface (5) are described. The film (7) is wound on a roller (3) having a circumference which is larger than or equal to the length of the film (7). Then the roller (3) is rotated relative to the surface (5), whereby the film (7) is transferred from the roller (3) to the surface (5).

8 Claims, 2 Drawing Sheets

METHOD OF PROVIDING A FILM ON A SURFACE, DEVICE FOR PROVIDING SAID FILM, AND DISPLAY SCREEN PROVIDED WITH SAID FILM

BACKGROUND OF THE INVENTION

OBJECT OF THE INVENTION

The invention relates to a method of providing a film of a given length on a surface.

The invention also relates to a device for providing a film of a given length on a surface.

The invention further relates to a display screen having a surface and a film provided on this surface by means of such a method.

Such a method, device and display screen are described in, for example, British patent specification GB 2 298 816. This British patent specification discloses a device which is provided with a synthetic material guide rail against which the film to be provided on a display screen of a display tube is held by means of rollers. The device is further provided with a separate pressure roller located next to the guide rail. To provide a film on the display screen, one end of the film is gripped between clamps whereafter the pressure roller, the guide rail and the guide rollers are displaced with respect to the display screen. During displacement of the device, the film moves between the guide rail and the guide rollers towards the display screen where the film is pressed against the display screen by means of the pressure roller.

A drawback of this known method and device is that the provision of the film is relatively complicated.

It is an object of the invention to provide a method by which a film can be provided on a surface in a relatively simple manner.

In the method according to the invention, this object is achieved in that the film is wound around a roller having a circumference which is larger than or equal to the length of the film, whereafter the roller is unwound relative to the surface while the film is transferred from the roller to the surface.

Since the film is transported, transferred and pressed onto the surface by means of the roller, the provision of the film on the surface is relatively simple and insensitive to disturbances.

Moreover, when the film is being provided and pressed onto the surface, forces substantially only transverse to the surface of the film are exerted on the film. As a result, unwanted forces in the plane of the film, which could deform the film, are avoided.

An embodiment of the method according to the invention is characterized in that the film is drawn against the roller by means of vacuum, which vacuum is eliminated proximate to a portion of the film as soon as the portion is located proximate to the surface.

In this way, the whole film can be tightly drawn against the roller so that a good support of the film is guaranteed. Moreover, the side to be provided on the surface remains completely free in this way, so that there will be no contamination due to contact with guide rollers as in the above-mentioned British patent specification.

A further embodiment of the method according to the invention is characterized in that the roller is rotated while the surface is translated relative to the roller, the circumferential speed of the roller being substantially equal to the speed of displacement of the surface.

By rotating the roller and translating the surface relative to the roller, the roller is unwound on the surface in a simple manner.

It is possible to cause the roller to make both a rotating and a translating movement or to move the surface along the stationary roller.

It is a further object of the invention to provide a device with which the drawbacks of the known device are avoided.

In the device according to the invention, this object is achieved in that the device is provided with a roller having a circumference which is larger than or equal to the length of the film to be provided, means for winding a film around the roller and means for unwinding the film relative to the surface.

The film can be supported, transported, transferred and pressed against the surface in a simple manner by means of the roller.

A further object of the invention is to provide a display screen which can be manufactured in an easier manner. The invention is particularly important for flat panel or cylindrical display screens such as are used in display tubes, PDPs (plasma display panels), LCDs (liquid crystal devices) but also for faceplates of display screens.

In the display screen according to the invention, this object is achieved in that the display screen has a surface and a film provided on the surface, which film is provided by means of the method according to the invention.

A film provided on a display screen serves as a protection for the visible part of this display screen. The film thus has a predetermined transmission so that light can exit from the display screen through the film.

In an embodiment of the display screen according to the invention, the transmission of the film proximate to the center of the film is lower than proximate to the edges of the film. In this way, it is possible to increase the transmission in the corners of the film and thus the corners of the display screen with respect to the center.

A further embodiment of the display screen according to the invention is characterized in that the film is provided with at least a dye whose absorption ranges are between emission spectra of phosphors in the display screen. Such a film-integrated dye such as, for example, ZAPON VIOLET 506 of BASF has a positive effect on the light contrast performance of the display screen.

These and other aspects of the invention are apparent from and will be elucidated with reference to the embodiments described hereinafter.

BRIEF DESCRIPTION OF THE INVENTION

In the drawings.

Corresponding components in the Figures are denoted by the same reference numerals.

DESCRIPTION OF THE PREFERRED EMBODIMENTS

Figure 1:
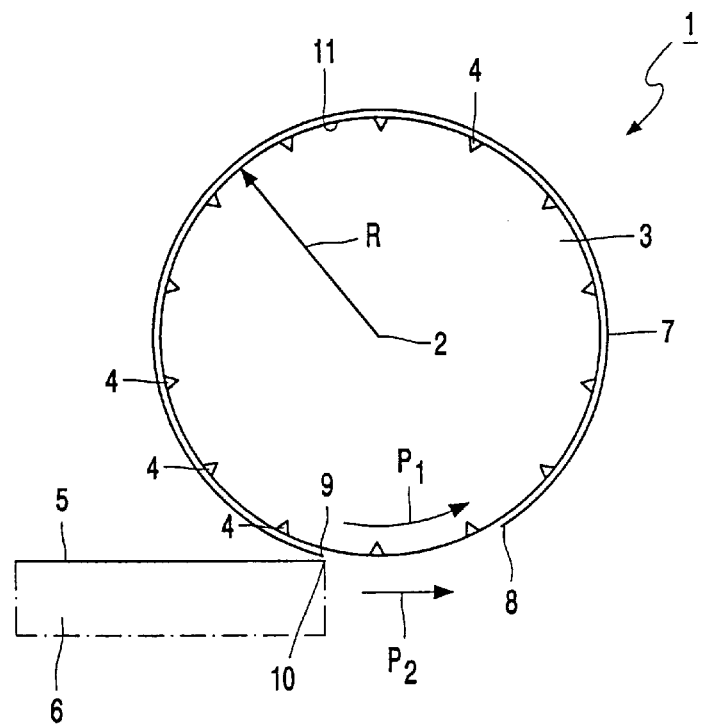
FIG. 1 is a diagrammatic side elevation of a device according to the invention.

FIG. 1 shows a device 1 according to the invention, which is provided with a roller 3 which is rotatable around a centerline 2 in the direction indicated by arrow P1. Roller 3 has a plurality of suction nozzles 4 which are connected to a vacuum pump (not shown). The device 1 is further provided with a transport mechanism for translating an object 6 having a surface 5 in the direction indicated by arrow P2. The object 6 is, for example, a display screen whose surface 5 constituting the display screen is to be provided with a film 7. The film 7 is, for example, a PSA (pressure-sensitive adhesive), a hard coat connected thereto and a PET layer connected thereto, having a total thickness of, for example, 0.2 mm.

The device 1 operates as follows.

The roller 3 is positioned above a stack of films 7 by means of a displacement mechanism. Subsequently, the film 7 is wound on the roller 3 from a first end 8 to the proximity of a second end 9 facing away from the first end 8. During winding of the film 7 on the roller 3, sub-pressure is exerted via the nozzles 4, so that the film is taken along by the roller 3 and wound around the roller 3.

The roller 3 has such a circumference that the film 7 can be wound completely around the roller 3 without the first and second ends 8 and 9 overlapping each other. This means that the film 7 has a shorter length than $2\pi R$ of the roller 3, in which R is the radius of the roller 3.

Subsequently, the roller 3 with the film 7 wound around it is positioned opposite the surface 5, while the end 9 is positioned opposite an end 10 of the surface 5. Subsequently, the roller 3 is rotated in the direction indicated by arrow P1 at a given rotational speed, while the display tube 6 with the surface 5 is displaced at a displacement speed in the direction indicated by arrow P2, which displacement speed is substantially equal to the circumferential speed. Consequently, the roller 3 unwinds on the surface 5. As soon as a portion of the film 7 engages the surface 5, the sub-pressure in the proximate nozzle 4 is eliminated so that the film 7 is detached from roller 3 and remains on the surface 5. After the roller 3 has performed a substantially complete rotation, the entire film 7 has been provided on the surface 5. During winding of the roller 3 on the surface 5, the film 7 is pressed against the surface 5 by means of the roller 3 and at a predetermined, desired force. To ensure an even and satisfactory pressure, also in the case of surface variations of the display tube, the roller 3 has, for example, a rubber layer of 15 mm (30 Durometer Nitrile rubber).

Figure 2:
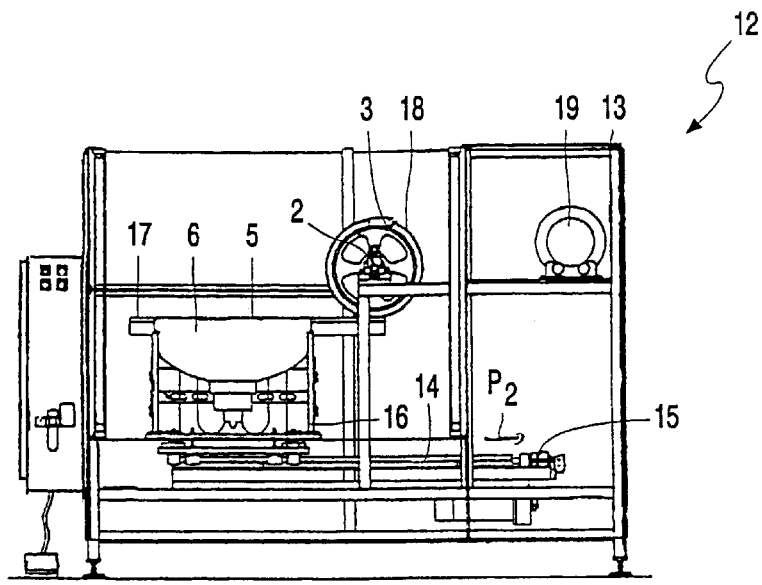
FIG. 2 is a side elevation of another device according to the invention.
Figure 3:
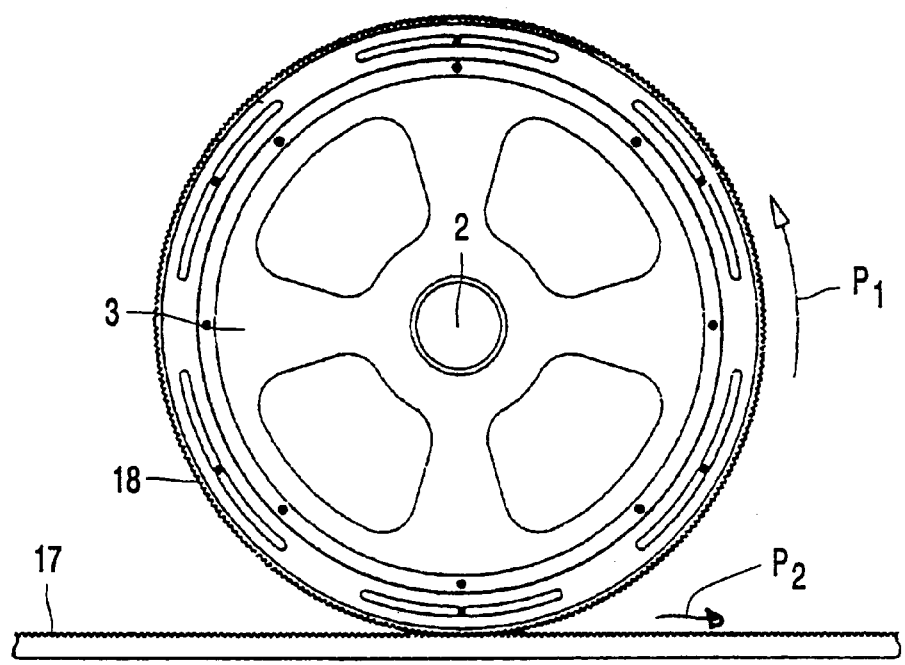
FIG. 3 shows a detail of the device of FIG. 2.

FIGS. 2 and 3 are a side elevation and a detail, respectively, of another embodiment of a device 12 according to the invention, provided with a frame 13. The frame 13 is provided with a straight guide rail 14 along which a support 16 for a display tube 6 can be displaced by means of a motor 15 in a direction indicated by arrow P2. Proximate to a surface 5 of the display tube 6, the support 16 is provided with a rack 17 which engages a pinion 18 which is connected to one end of a roller 3. A film 7 is positioned on the roller 3 (in the way as shown in FIG. 1), whereafter the film is pressed by suction against the roller 3 by means of a vacuum pump 19. Subsequently, the support 16 is transported by means of the motor 15 in the direction indicated by arrow P2, as a result of which the pinion 18 engaging the rack 17 is rotated around the shaft 2 in the direction indicated by arrow P1, and the film on the roller 3 is unwound on the surface 5.

It is alternatively possible to provide the surface 5 with a given adhesive in advance, so that the film 7 firmly adheres to the surface 5.

The film 7 preferably has a predetermined transmission which varies from the first end 8 towards the second end 9 in such a way that the transmission proximate to the ends 8, 9 is higher than proximate to the center 11 of the film. The film 7 may be further provided with dyes having absorption ranges between the emission spectra of the phosphors. Both the variation of the transmission and the provision of the dyes have a favorable effect on the light source performance of the film 7 and thus of the display screen 6.

It is alternatively possible to give the film 7 a color which corresponds to the color of, for example, the housing of the display screen 6.

It is alternatively possible to provide the film with a photochrome material or to construct it as a touch screen.

It is possible to provide a display tube, PDP, LCD but also a face plate for display screens or other surfaces with a film in this way.

It will be clear that within the framework of the invention many variations are possible. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of other elements or steps than those listed in a claim.

In short the invention may be described as:

A method and a device for affixing a film 7 of a predetermined length to a surface 5. The film 7 is wound on a roller 3 having a circumference which is larger than or equal to the length of the film 7. Then the roller 3 is rotated relative to the surface 5, whereby the film 7 is transferred from the roller 3 to the surface 5.

What is claimed is:

1. A method of providing a film (7) of a given length on a surface (5), comprising:

positioning a roller above a film, winding the film (7) around the roller (3) having a circumference which is larger than or equal to the length of the film (7), displacing the roller to a position opposite the surface, and unwinding the roller (3) relative to the surface (5) while the film (7) is transferred from the roller (3) to the surface (5).

2. A method as claimed in claim 1, characterized in that the film (7) is drawn against the roller (3) by means of vacuum.

3. A method as claimed in claim 2, wherein the vacuum is eliminated proximate to a portion of the film (7) as soon as the portion is located proximate to the surface (5).

4. A method as claimed in claim 1, characterized in that the roller (3) is rotated while the surface (5) is translated relative to the roller (3), the circumferential speed of the roller (3) being substantially equal to the speed of displacement of the surface (5).

5. A device for providing a film (7) of a given length on a surface (5), characterized in that the device is provided with a roller (3) having a circumference which is larger than or equal to the length of the film (7) to be provided, means for winding a film (7) around the roller (3), means for displacing the roller, and means for unwinding the film (7) relative to the surface (5).

6. A device as claimed in claim 5, characterized in that the roller (3) is provided with suction nozzles (4).

7. A device as claimed in claim 5, characterized in that the roller (3) is rotatable.

8. A device as claimed in claim 5, characterized in that the device is provided with a displaceable support (16) for the surface (5).

* * * * *